United States Patent
Kumar et al.

(10) Patent No.: US 10,359,910 B2
(45) Date of Patent: Jul. 23, 2019

(54) CROSS VALIDATION OF USER FEEDBACK IN A DIALOG SYSTEM

(71) Applicant: International Business Machines Corporation, Armonk, NY (US)

(72) Inventors: Ashok T. Kumar, North Chelmsford, MA (US); Dan O'Connor, Milton, MA (US); William G. O'Keeffe, Tewksbury, MA (US); David D. Taieb, Charlestown, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 637 days.

(21) Appl. No.: 15/006,245

(22) Filed: Jan. 26, 2016

(65) Prior Publication Data
US 2017/0212770 A1    Jul. 27, 2017

(51) Int. Cl.
*G06F 3/0482* (2013.01)
*G06F 16/28* (2019.01)
*G06F 8/38* (2018.01)
*G06F 9/451* (2018.01)

(52) U.S. Cl.
CPC .............. *G06F 3/0482* (2013.01); *G06F 8/38* (2013.01); *G06F 9/451* (2018.02); *G06F 16/285* (2019.01)

(58) Field of Classification Search
CPC ........... G06F 9/451; G06F 3/0482; G06F 8/38
See application file for complete search history.

(56) References Cited

U.S. PATENT DOCUMENTS

| | | | |
|---|---|---|---|
| 6,571,234 B1* | 5/2003 | Knight | G06Q 10/10 |
| 7,756,970 B2* | 7/2010 | Ebert | G09B 7/02 |
| | | | 702/182 |
| 8,019,753 B2* | 9/2011 | Podgorny | G06Q 10/10 |
| | | | 707/722 |
| 8,843,851 B1 | 9/2014 | Gotchy et al. | |
| 8,869,022 B1* | 10/2014 | Mills | G06F 9/453 |
| | | | 715/230 |
| 2008/0209328 A1* | 8/2008 | Parkinson | G06F 9/451 |
| | | | 715/733 |
| 2013/0132814 A1* | 5/2013 | Mangini | G06F 17/24 |
| | | | 715/230 |
| 2016/0147971 A1* | 5/2016 | Kolowitz | G06F 3/0481 |
| | | | 715/753 |

* cited by examiner

*Primary Examiner* — Omar R Adbul-Ali
(74) *Attorney, Agent, or Firm* — Cantor Colburn LLP; Will Stock (57) ABSTRACT

Aspects include cross validation of user feedback in a dialog system. A repository of previous user feedback associated with a user interface is accessed. One or more identified features in the previous user feedback are classified. A sequence of cross-validation questions is generated in a dialog system to elicit further feedback from a current user of the user interface based on the one or more identified features and observed interactions of the current user with the user interface. Responses to the sequence of cross-validation questions are filtered to group the further feedback associated with the one or more identified features. One or more change suggestions to modify the user interface are stored based on the previous user feedback and the further feedback associated with the one or more identified features.

18 Claims, 6 Drawing Sheets

CROSS VALIDATION OF USER FEEDBACK IN A DIALOG SYSTEM

BACKGROUND

The invention relates generally to extracting user experience feedback, and more specifically, to cross validation of user feedback in a dialog system.

Conventional user experience feedback processes are typically focused on collecting feedback in a blind fashion without considering whether the feedback has any relevance or validity, typically in the form of user complaints or generic surveys. A typical workflow includes collecting data from multiple users, and consolidated lists of feedback are reviewed by user interface designers. Subsequently, user interface designers come up with either changes or play back sessions to address validity/implementation of the feedback. However, given unfocused feedback and no link back to the source of the feedback, the effectiveness of the changes in meeting the intention of the feedback can be uncertain.

SUMMARY

According to an embodiment a method, system, and computer program product for cross validation of user feedback in a dialog system are provided. The method includes accessing a repository of previous user feedback associated with a user interface. One or more identified features in the previous user feedback are classified. A sequence of cross-validation questions is generated in a dialog system to elicit further feedback from a current user of the user interface based on the one or more identified features and observed interactions of the current user with the user interface. Responses to the sequence of cross-validation questions are filtered to group the further feedback associated with the one or more identified features. One or more change suggestions to modify the user interface are stored based on the previous user feedback and the further feedback associated with the one or more identified features.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments collect, analyze and cross validate user feedback via a dialog system, such as an artificial intelligence question answering system using natural language processing. Websites and web applications can track where a user clicks within a typical web session. Embodiments use click tracking data to generate a user feedback dialog with the user to enquire further about why a particular user interface element was not clicked on/selected.

The dialog system elicits user feedback in the form of an interactive natural language dialog exchange asking for feedback about particular parts of the user experience which have either received negative feedback from other users or have been ignored by the user. The dialog system automates the dialog exchange rather than having a human operator interact with the user in a chat-type session. Embodiments can use the results of the feedback (e.g., one or more change suggestions) to modify the user interface and present the changes to the user for further feedback or validation.

Figure 1:
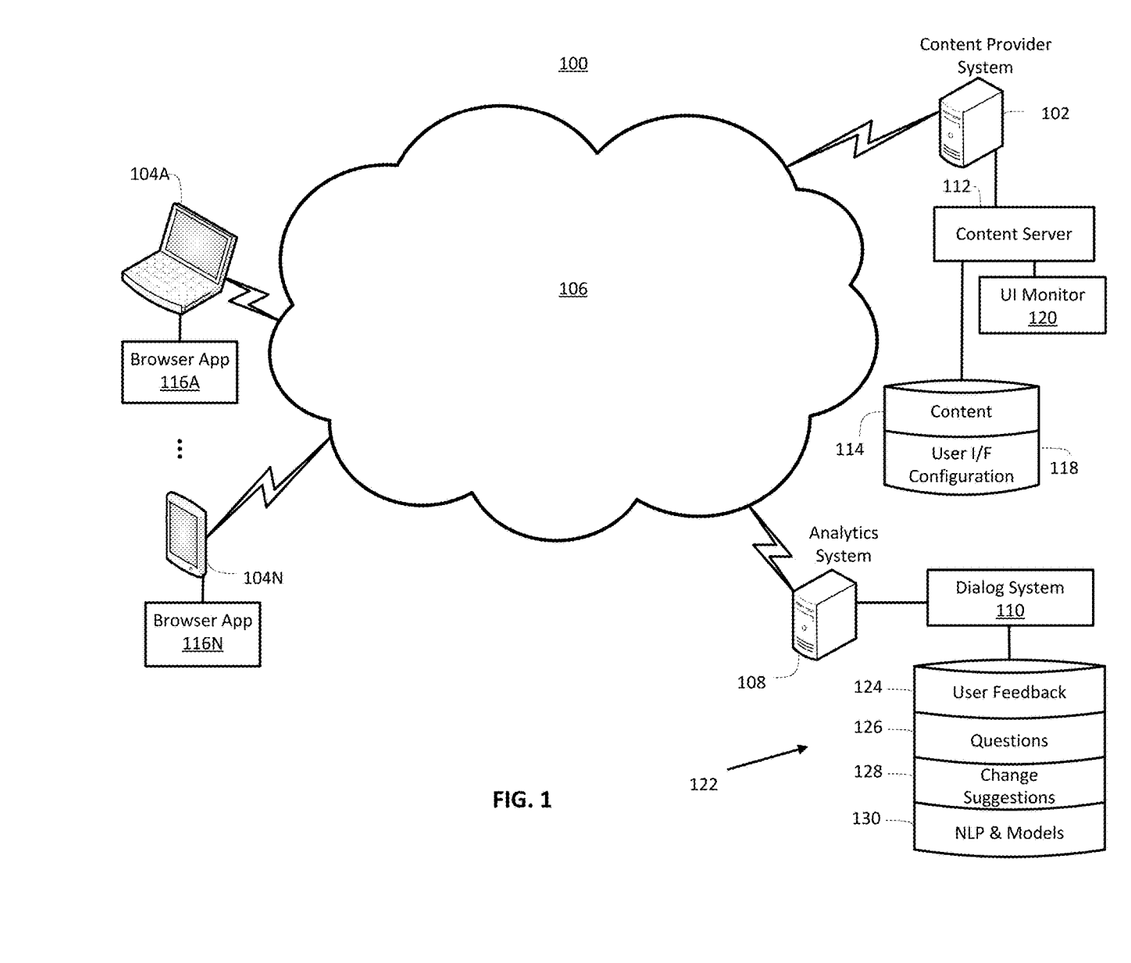
FIG. 1 depicts a system in accordance with an embodiment.

Turning now to FIG. 1, an example of a system 100 upon which cross validation of user feedback may be implemented will now be described in greater detail. The system 100 represents a networked environment, such as the Internet, where content of interactive user interface sessions and the like can be transmitted between one or more server and electronic devices of users.

In the example depicted in FIG. 1, the system 100 includes a content provider system 102 configured to communicate with one or more electronic devices 104A-N over a network 106. The network 106 may be any type of communications network known in the art and can include a combination of wireless, wired, and/or fiber optic links. The content provider system 102 can also communicate with an analytics system 108 via the network 106 to interact with a dialog system 110. Although only one content provider system 102 and one analytics system 108 are depicted in FIG. 1, it will be understood that there can be multiple content provider systems 102 and/or multiple analytics systems 108 which can interface with other networked components and electronic devices 104A-N across the network 106 over a geographically wide area. Further, a portion or all of the analytics system 108 can be combined with the content provider system 102.

In exemplary embodiments, the content provider system 102 and the analytics system 108 are each implemented on a high-speed processing device (e.g., a mainframe computer system, a cloud computing system, or the like) including at least one processing circuit (e.g., a computer processor/CPU) capable of reading and executing instructions, and handling interactions with various components of the system 100. Alternatively, the content provider system 102 and/or the analytics system 108 can be embodied entirely in hardware including circuits and memory to perform processes as described herein. In the example of FIG. 1, the content provider system 102 includes a content server 112 configured to provide content 114 to one or more of the electronic devices 104A-N. The content server 112 may be an application executable on the content provider system 102. The content 114 may be web-enabled content, such as one or more web pages or web applications that are accessible through browser application 116A-N on electronic devices 104A-N.

A user interface configuration 118 can define how the content 114 is served by the content server 112 and presented for display on one or more of the browser applications 116A-N. For example, user interface definitions may be configured according to a device type, an operating system, and/or browser type of each of the electronic devices 104A-N. The user interface configuration 118 may also customize user interface characteristics on a per user basis. A user interface monitor 120 can monitor interactions of a user of one of the browser applications 116A-N with a user interface and the content 114, such as clicking on/selecting particular user interface elements as well as requests to navigate away from a current web page. A time sequenced history of user interface interactions observed by the user interface monitor 120 can be stored in the user interface configuration 118.

In exemplary embodiments, the electronic devices 104A-N can include a variety of computing devices with processing circuits and I/O interfaces, such as keys/buttons, a touchscreen, audio input, a display device and audio output. The electronic devices 104A-N may be embodied in any type of computing device known in the art, such as a laptop, tablet computer, mobile device, personal computer, workstation, server, and the like. Accordingly, the electronic devices 104A-N can include various computer/communication hardware and software technology known in the art, such as one or more processing units or circuits, volatile and non-volatile memory including removable media, power supplies, network interfaces, support circuitry, operating systems, and the like.

The content server 112 and/or the user interface monitor 120 can interface with the dialog system 110 of the analytics system 108 to initiate an interactive dialog with a user of one of the electronic devices 104A-N. For example, upon detecting that a user of browser application 116A has requested to navigate away from a web page that displays a portion of the content 114, the user interface monitor 120 or the content server 112 can trigger the dialog system 110 to launch a dialog session to elicit user feedback regarding the user interface design as observed by the user. The dialog system 110 can request feedback as an interactive natural language question/answer system. Parsing of user input and natural language processing can be performed according to known parsers and tools. Examples of parsers that can be used include, but are not limited to an English Slot Grammar (ESG) parser from IBM and the OpenNLP suite of language processing tools.

Figure 2:
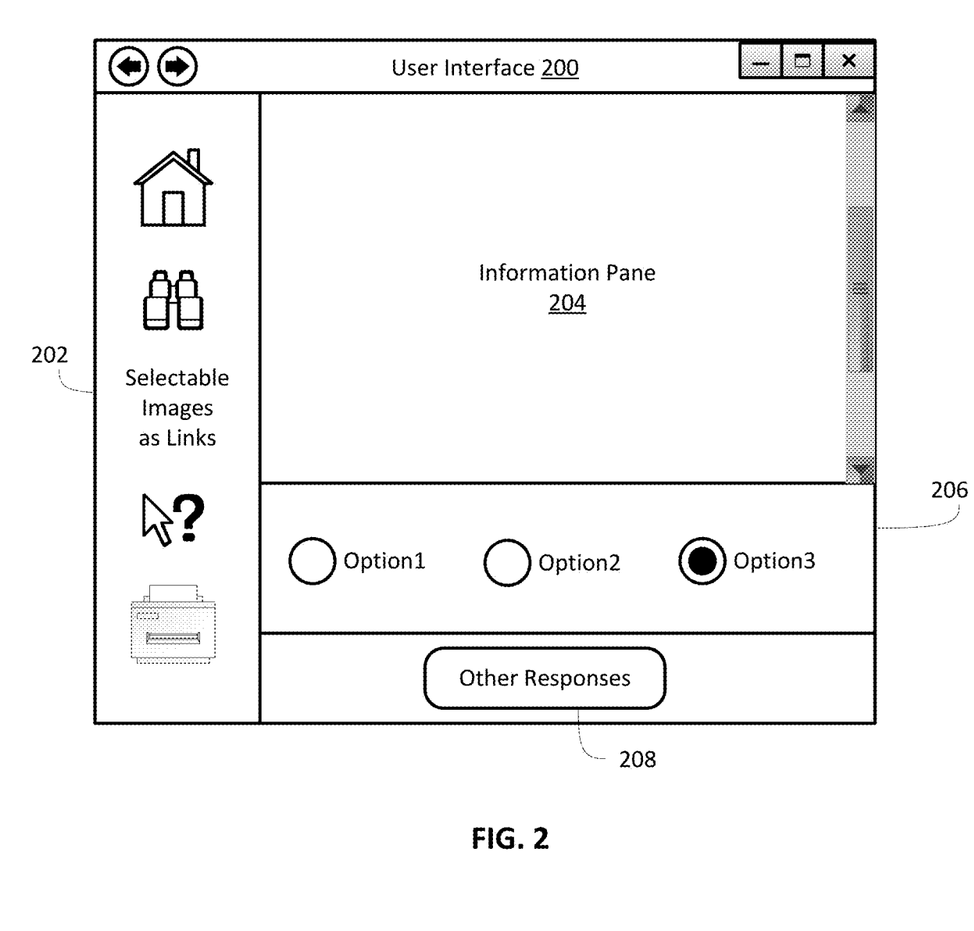
FIG. 2 depicts a user interface in accordance with an embodiment.
Figure 3:
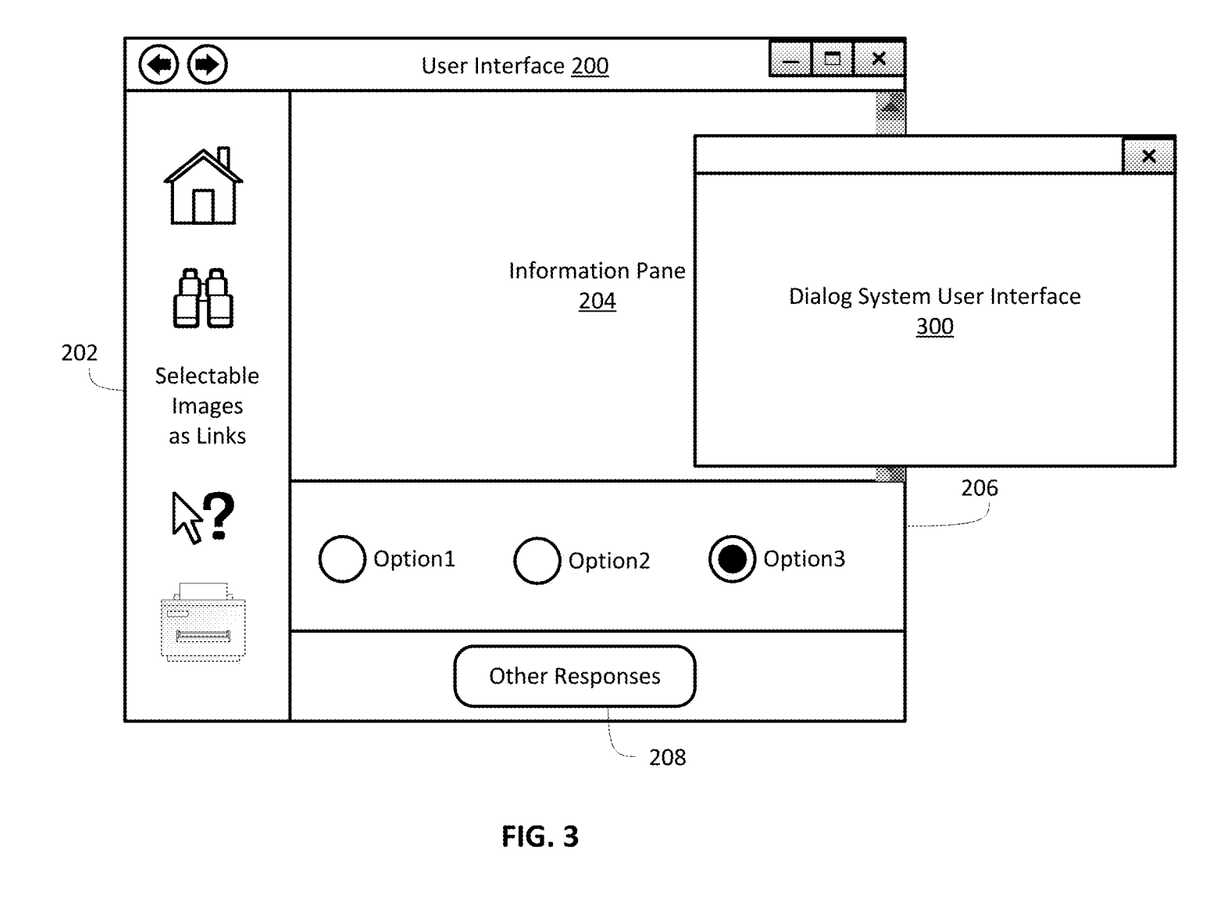
FIG. 3 depicts a dialog system user interface in accordance with an embodiment.
Figure 4:
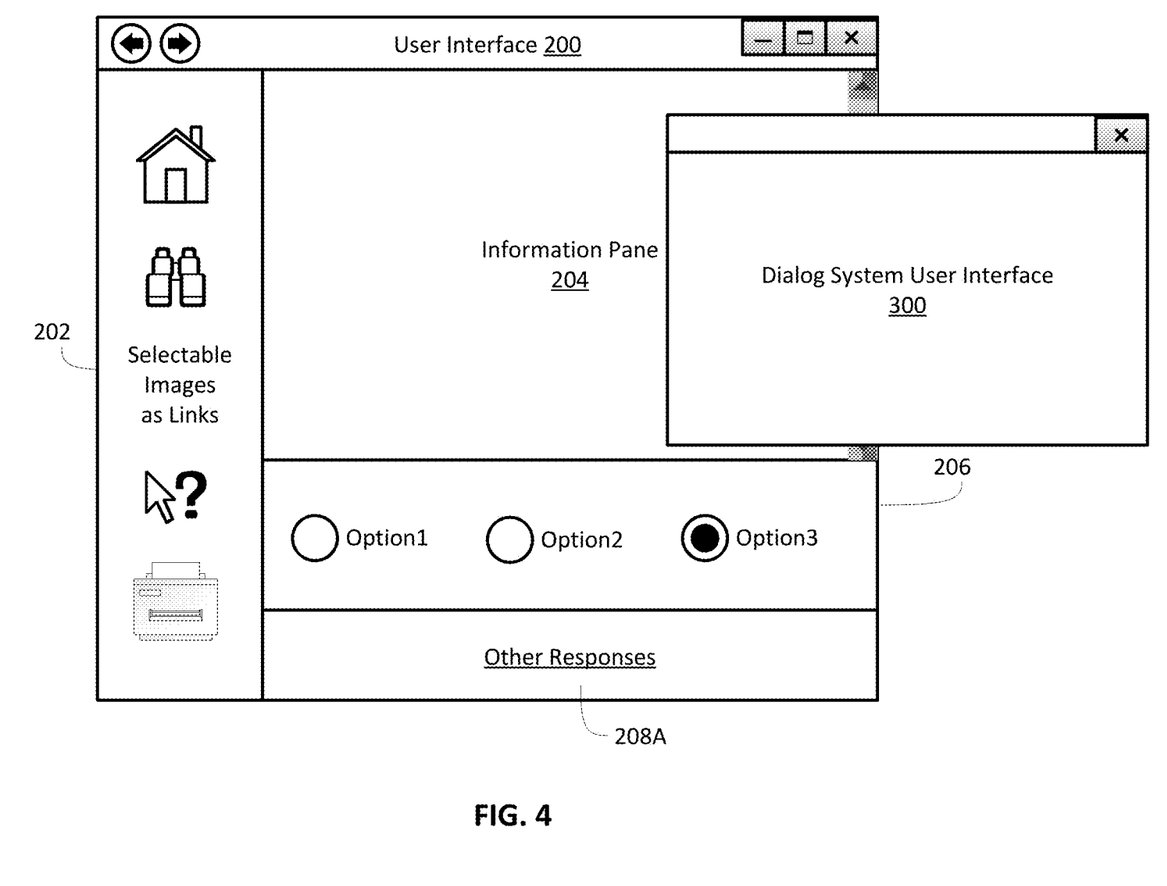
FIG. 4 depicts a modification of the user interface of FIG. 2 in accordance with an embodiment.

With continuing reference to FIG. 1 and in further reference to FIGS. 2-4, the dialog system 110 can receive information from the user interface monitor 120 regarding observed interactions of a current user with a user interface 200 for which further feedback is desired. The dialog system 110 accesses a repository 122 that stores user feedback 124, such as previous user feedback associated with the user interface 200. Embodiments generate questions 126 based on previous user feedback/comments and on observed interactions with elements of the user interface 200. Questions 126 generated by the dialog system 110 are sequenced to engage the user to provide further feedback. The dialog system 110 can use a combination of natural language processing algorithms to identify or sift through the previous user feedback/comments to filter out what is irrelevant (e.g., off topic remarks, unrecognizable words/symbols, etc.) and from the relevant filtered set apply machine models to extract features representing user interface elements, where supporting values for natural language processing algorithms and machine models 130 may be stored in repository 122. For example, a button position in a layout may not be considered user friendly, or the color of a link may not contrast well with its surrounding. If there is sufficient scoring from the machine models to classify the feedback, the dialog system 110 generates a set of questions 126 for cross validation relevant to the identified feedback features.

The dialog system 110 can use natural language processing to generate questions 126 as cross-validated questions which can trigger tangible answers (e.g., Yes or No; How would you rate the user interface artifact/feature from 1 to 10—1 being bad and 10 being very good, etc.) The set of cross validation questions, which can include a set of primary questions and follow up questions, are sequenced and presented to users to extract answers. The responses can be filtered in real time using the same techniques applied in filtering the original questions (e.g., filtering out off-topic remarks, unrecognizable words/symbols, etc.). Responses after filtering are collected to enable ranking of feedback over a period of time from multiple users.

Observed behavior of one or more users can be monitored over a number of sessions to identify features of the user interface 200 that have not been selected or selected with a substantially lower frequency, such as not clicking on a particular link within the user interface 200. The dialog system 110 can engage a current user through dialog system user interface 300 of FIG. 3 for feedback as to why the current user did not click on a particular element. The current user can provide feedback, which is similarly processed to filter feedback as relevant or irrelevant. The feedback of the current user can be presented to future users as feedback requiring cross validation.

In the example of FIG. 2, the user interface 200 includes selectable images as links 202, an information pane 204, option selections 206, and Other Responses button 208. As one example, the dialog system 110 may have observed that a predetermined percentage of users have not clicked on the Other Responses button 208. Either during the user's session, or before the user exits, the dialog system 110 can engage the user in a dialog using the dialog user interface 300 of FIG. 3 with the following interaction example:

Dialog System> Do you mind if I ask you a couple of questions related to your experience today before you exit?

User> Sure.

Dialog System> Thanks! I noticed that you did not click on the Other Responses button when a response was returned with multiple possible answers. I'd like to know why that was?

User> I am not sure of the button you are referring to?

Dialog System> It looks like this within the user interface (with embedded image of Other Responses button 208 or highlighting of Other Responses button 208 on user interface 200).

User> I did not notice the button, and would have expected to see a link!

Dialog System> Thank you for your feedback, I will take this onboard. Have a nice day.

On a subsequent session a different user similarly does not click on the Other Responses button 208 after asking multiple questions. The dialog system 110 may interact through the dialog system user interface 300 as follows:

Dialog System> Do you mind if I ask you a couple of questions related to your experience today before you exit?

User> OK.

Dialog System> Thank you! I noticed that you did not click on the Other Responses button during your session today. Other users have told me that they were not aware of this button. Did you notice it?

User> I didn't.

Dialog System> OK, that is valuable feedback. Other users have reported that changing the button to a link would make it more obvious, do you agree?

User> No.

Dialog System> Do you have an alternative suggestion besides a link?

User> Yes, I think changing the position of the button to be directly below the information would make it more obvious.

Dialog System> This is great feedback. Thank you for your time, have a good afternoon.

Over time such interactions are processed and subsequent feedback is grouped in the user feedback 124. Once enough feedback is received a design team can analyze the user feedback 124 and propose new interfaces for the user as change suggestions 128. Alternatively, the dialog tool 110 dynamically determines the change suggestions 128 by interpreting and ranking the suggestions contained within the user feedback 124. Further user feedback may be sought through dialog system 110 to either validate or invalidate the change suggestions 128. For instance, users who had previously provided feedback can be notified of proposed user interface changes and asked to comment on the changes. Likewise, users who have not previously commented or provided feedback but are observed to be ignoring/not using an important piece of functionality may be prompted to validate the change suggestions 128.

In this example the user has already provided feedback in a previous session:

Dialog System> In a previous conversation with me you suggested that you did not use the Other Responses button because you did not notice it in the User Interface. We've been busy trying to remedy this issue. Click on the options below to see potential enhancements and provide your feedback:

A) Other Responses button replaced with a link Feedback: 1 - - - 10

B) Other Responses button replaced with an icon Feedback: 1 - - - 10

C) Other Responses button position change Feedback: 1 - - - 10

Dialog System> Thank you for your feedback!

In the case of a user who has been observed to click the Other Responses button 208, the dialog system 110 can detect this and prompt the user for feedback to make sure the new design does not negatively impact users who have used the particular user interface artifact as follows:

Dialog System> I noticed that you clicked on the Other Responses button after asking a question earlier. Other users have told me that they do not notice this button. My designers have proposed some different looks for this button, would you mind rating them?

A) Other Responses button replaced with a link Feedback: 1 - - - 10

B) Other Responses button replaced with an icon Feedback: 1 - - - 10

C) Other Responses button position change Feedback: 1 - - - 10

D) Keep the current user interface as is Feedback: 1 - - - 10

Beyond retrieving feedback from the end user, the user interface 200 can be modified dynamically. After obtaining initial feedback from a set of users, a design team can create one or more modified versions of the user interface 200 that can be selectable through the user interface configuration 118. Change suggestions 128 may be cross validated with a set of users both who had positive and negative impressions of the 'old' user interface 200. Dynamic modification of the user interface 200 can be performed, for example, using a JavaScript object with dynamically configurable hypertext markup language (HTML). Dynamically modifiable elements of the user interface 200 enables different visual representations to be swapped out while presenting users with various possible configurations and behavior characteristics.

As a further example, instead of a responsive design where the user interface 200 is modified based on available screen real estate, the user interface 200 can be modified based on user input as illustrated in the following interaction:

Dialog System> You previously gave feedback that you would prefer if the Other Responses button were a link. Other users have responded positively to changing the position of this button. Would you mind if I gave you a preview of both, using your last question as an example?

User> Go ahead.

Dialog System> Thank you! I will transition to you suggested user interface momentarily. You will see a "Show alternate" link at the bottom of the user interface which will allow you to preview the user interface favored by other users (for instance, Other Responses button 208 becomes Other Responses link 208A of FIG. 4).

After the user has seen both user interfaces, the dialog system 110 may ask [options can appear as radio buttons to allow for a straight vote amongst users]:

Dialog System> Please provide your feedback on which user interface you prefer:

Change user interface to use a link in place of button

Change user interface to reposition button

I don't like either option

Dialog System> Again, thank you for your feedback!

The feedback gathered here can then be synched back to the user feedback 124 and in turn back to the change suggestions 128. Once a verdict is reached and design/development has confirmed the change, the tasks and linked enhancement options can be automatically updated and the change put into production for all users through the user interface configuration 118. Previous feedback on the old format can be retained in the user feedback 124, and feedback cross validation starts over on the new design.

Figure 5:
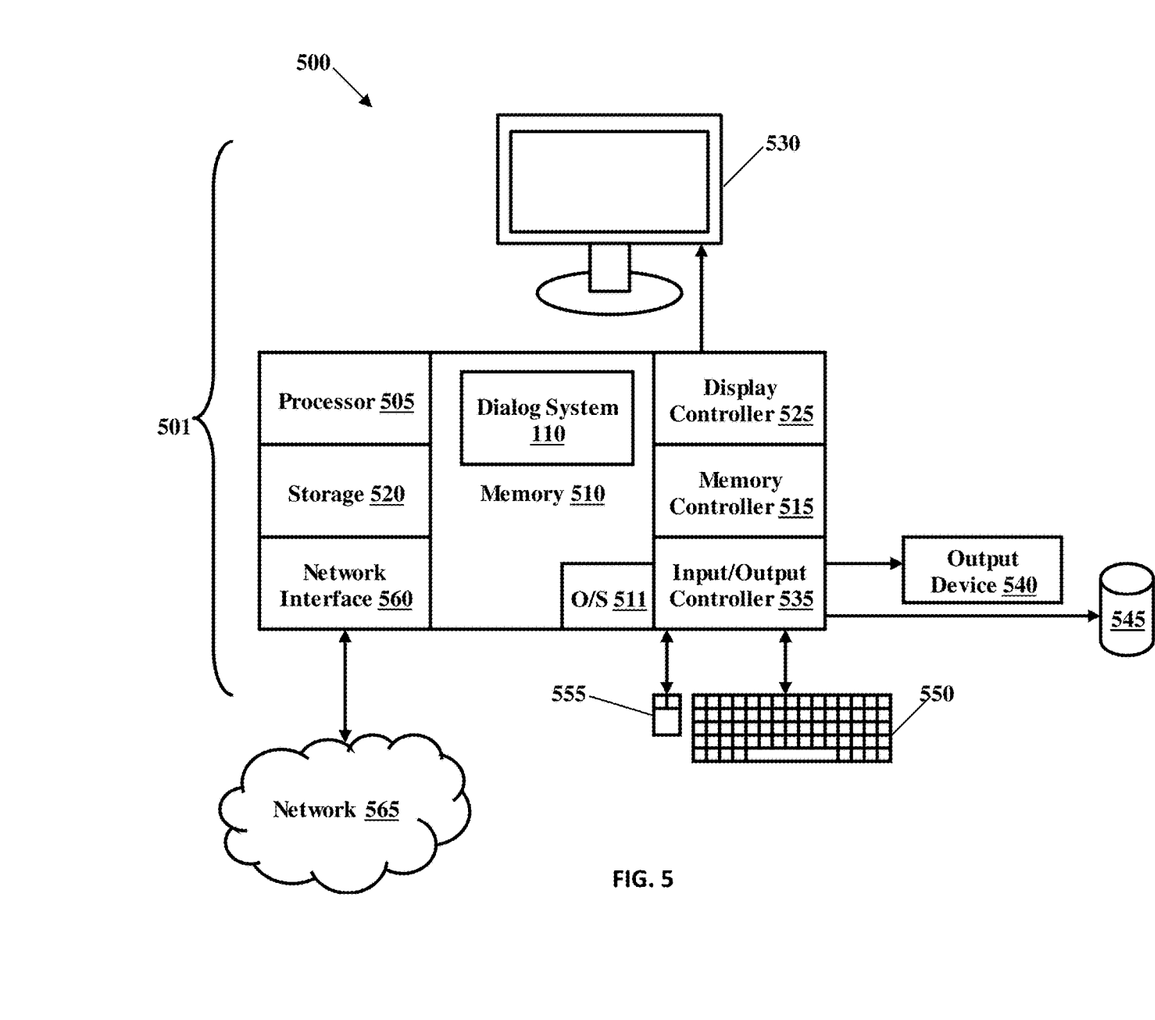
FIG. 5 depicts a block diagram of a computing device for implementing aspects of the system in accordance with an embodiment.

Turning now to FIG. 5, a block diagram of a computing device for implementing some or all aspects of the system is generally shown in accordance with an embodiment. FIG. 5 illustrates a block diagram of a computing device 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 500, such as a cellular phone, a personal digital assistant (PDA), tablet computer, personal computer, workstation, minicomputer, or mainframe computer for example.

In some embodiments, as shown in FIG. 5, the computing device 500 includes a processor 505, memory 510 coupled to a memory controller 515, and one or more input devices 545, and output devices 540, which are communicatively coupled via a local I/O controller 535. These devices 540, 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computing device 500, a semiconductor based microprocessor (in the form of a microchip or chip set), a macroprocessor, or other device for executing instructions.

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services. The instructions in the memory 510 also include instructions for implementing embodiments of the dialog system 110 described herein.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computing device 500 may further include a display controller 525 coupled to a display 530. In some embodiments, the computing device 500 may further include a network interface 560 for coupling to a network 565, such as network 106 of FIG. 1. The network 565 may be an IP-based network for communication between the computing device 500 and an external server, client and the like via a broadband connection. The network 565 transmits and receives data between the computing device 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 500, such as that illustrated in FIG. 5.

Figure 6:
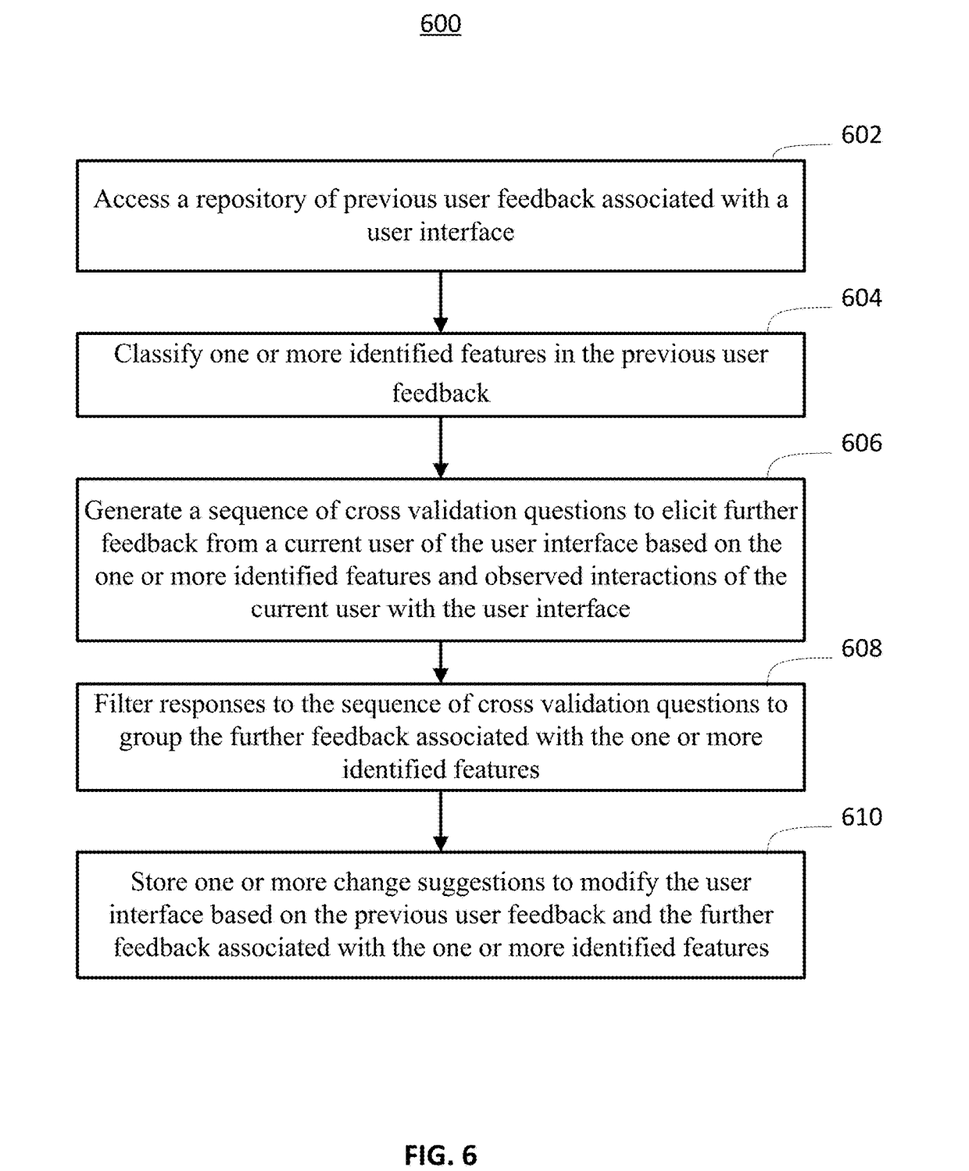
FIG. 6 depicts a flow diagram for cross validation of user feedback in a dialog system in accordance with an embodiment.

Turning now to FIG. 6, a flow diagram of a process 600 for cross validation of user feedback in a dialog system is generally shown in accordance with an embodiment. The process 600 is described in reference to FIGS. 1-4 and may include additional steps beyond those depicted in FIG. 6. The process 600 is described with respect to dialog system 110 but may be performed separately by or in combination with one or more other applications.

At block 602, the dialog system 110 accesses a repository 122 of previous user feedback, such as user feedback 124, associated with a user interface 200. The previous user feedback can include one or more responses directed to at least one feature of the user interface 200. The one or more responses in the previous user feedback can be filtered to remove data unrelated to the user interface 200.

At block 604, the dialog system 110 classifies one or more identified features in the previous user feedback. For example, using natural language processing algorithms and machine models 130, the dialog system 110 can identify entries in user feedback 124 directed to the selectable images as links 202, the information pane 204, the option selections 206, and/or the Other Responses button 208.

At block 606, the dialog system 110 generates a sequence of cross-validation questions, e.g., in questions 126, to elicit further feedback from a current user of the user interface 200 based on the one or more identified features and observed interactions of the current user with the user interface 200. Generating the sequence of cross-validation questions can include identifying at least one feature of the user interface 200 and presenting an alternate representation of the at least one feature to elicit the further feedback, such as Other Responses button 208 and Other Responses link 208A. Features can be identified by the user interface monitor 120 observing that the current user did not select the features during a current session of interacting with the user interface 200. The dialog system 110 can apply natural language processing algorithms and machine models 130 to extract features representing elements of the user interface 200 from the previous user feedback to generate the sequence of cross-validation questions. The sequence of cross-validation questions can include one or more follow-up questions based on changes made to the user interface 200 with respect to a previous version of the user interface 200.

At block 608, the dialog system 110 filters responses to the sequence of cross-validation questions to group the further feedback associated with the one or more identified features. Filtering can remove responses that are not identified as being relevant to the identified features.

At block 610, the dialog system 110 stores one or more change suggestions 128 to modify the user interface 200 based on the previous user feedback and the further feedback associated with the one or more identified features. The user interface 200 can be dynamically modified in real time based on the one or more change suggestions 128.

Technical effects and benefits include cross validation of user feedback in a dialog system. Using an artificial intelligence based natural language interface, feedback related to user interface designs can be gathered and cross validated by comparing a sequence of responses from the same user or multiple users. Presenting change suggestions as other user interface design options to users during a feedback session can reduce the time needed to develop and deploy user interface updates. Dynamically updating user interfaces based on user feedback can reduce design burdens while giving users an improved user experience.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    accessing, by a dialog system of an analytics system configured to communicate with a content provider system through a network, a repository of previous user feedback associated with a user interface of an electronic device coupled to the network, the user interface configured and monitored for user interactions by the content provider system;
    classifying, by the dialog system, one or more identified features in the previous user feedback;
    generating, by the dialog system, a sequence of cross-validation questions in the dialog system to elicit further feedback from a current user of the user interface of the electronic device based on the one or more identified features and observed interactions of the current user with the user interface, wherein the dialog system applies natural language processing and machine models to extract features representing elements of the user interface from the previous user feedback to generate the sequence of cross-validation questions;
    filtering, by the dialog system, responses to the sequence of cross-validation questions to group the further feedback associated with the one or more identified features; and
    storing, by the dialog system, one or more change suggestions to modify the user interface based on the previous user feedback and the further feedback associated with the one or more identified features.

2. The method of claim 1, wherein generating the sequence of cross-validation questions further comprises identifying at least one feature of the user interface and presenting an alternate representation of the at least one feature to elicit the further feedback.

3. The method of claim 2, wherein the at least one feature is identified based on observing that the current user did not select the at least one feature during a current session of interacting with the user interface.

4. The method of claim 2, wherein the previous user feedback comprises one or more responses directed to the at least one feature of the user interface.

5. The method of claim 4, wherein the one or more responses of the previous user feedback are filtered to remove data unrelated to the user interface.

6. The method of claim 1, wherein the sequence of cross-validation questions further comprises one or more follow-up questions based on changes made to the user interface with respect to a previous version of the user interface.

7. The method of claim 1, wherein the user interface is dynamically modified in real time based on the one or more change suggestions.

8. A system, comprising:
    a memory of an analytics system having computer readable instructions for a dialog system, the analytics system configured to communicate with a content provider system through a network; and
    a processor of the analytics system for executing the computer readable instructions for the dialog system, the computer readable instructions including:
    accessing a repository of previous user feedback associated with a user interface of an electronic device coupled to the network, the user interface configured and monitored for user interactions by the content provider system;
    classifying one or more identified features in the previous user feedback;
    generating a sequence of cross-validation questions in the dialog system to elicit further feedback from a current user of the user interface of the electronic device based on the one or more identified features and observed interactions of the current user with the user interface, wherein the dialog system applies natural language processing and machine models to extract features representing elements of the user interface from the previous user feedback to generate the sequence of cross-validation questions;
    filtering responses to the sequence of cross-validation questions to group the further feedback associated with the one or more identified features; and
    storing one or more change suggestions to modify the user interface based on the previous user feedback and the further feedback associated with the one or more identified features.

9. The system of claim 8, wherein generating the sequence of cross-validation questions further comprises identifying at least one feature of the user interface and presenting an alternate representation of the at least one feature to elicit the further feedback.

10. The system of claim 9, wherein the at least one feature is identified based on observing that the current user did not select the at least one feature during a current session of interacting with the user interface.

11. The system of claim 9, wherein the previous user feedback comprises one or more responses directed to the at least one feature of the user interface.

12. The system of claim 11, wherein the one or more responses of the previous user feedback are filtered to remove data unrelated to the user interface.

13. The system of claim 8, wherein the cross validation questions further comprise one or more follow-up questions based on changes made to the user interface with respect to a previous version of the user interface.

14. The system of claim 8, wherein the user interface is dynamically modified in real time based on the one or more change suggestions.

15. A computer program product comprising a computer readable storage medium having program instructions embodied therewith, the program instructions executable by a processor of an analytics system to cause the computer processor to perform:
    accessing, by a dialog system of the analytics system configured to communicate with a content provider system through a network, a repository of previous user feedback associated with a user interface of an electronic device coupled to the network, the user interface configured and monitored for user interactions by the content provider system;

classifying, by the dialog system, one or more identified features in the previous user feedback;

generating, by the dialog system, a sequence of cross validation questions to elicit further feedback from a current user of the user interface of the electronic device based on the one or more identified features and observed interactions of the current user with the user interface, wherein the dialog system applies natural language processing and machine models to extract features representing elements of the user interface from the previous user feedback to generate the sequence of cross-validation questions;

filtering, by the dialog system, responses to the sequence of cross validation questions to group the further feedback associated with the one or more identified features; and storing, by the dialog system, one or more change suggestions to modify the user interface based on the previous user feedback and the further feedback associated with the one or more identified features.

16. The computer program product of claim 15, wherein the cross validation questions comprise identifying at least one feature of the user interface and presenting an alternate representation of the at least one feature to elicit the further feedback.

17. The computer program product of claim 15, wherein the cross validation questions further comprise one or more follow-up questions based on changes made to the user interface with respect to a previous version of the user interface.

18. The computer program product of claim 15, wherein the user interface is dynamically modified in real time based on the one or more change suggestions.

* * * * *